United States Patent
Shibata et al.

[11] Patent Number: 5,911,450
[45] Date of Patent: *Jun. 15, 1999

[54] METHOD AND APPARATUS FOR PREVENTING DISTORTION OF A WIRE HARNESS BY MARKING THE HARNESS WITH A CONTRASTING STRAIGHT LINE

[75] Inventors: Hideaki Shibata; Yuji Ikuta; Tamiyuki Makito; Yasushi Atsumi, all of Yokkaichi, Japan

[73] Assignee: Sumitomo Wiring Systems, Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/789,742

[22] Filed: Jan. 27, 1997

[30] Foreign Application Priority Data

Jan. 30, 1996 [JP] Japan ................................. 8-014307

[51] Int. Cl.$^6$ ...................................................... B23Q 17/00
[52] U.S. Cl. ........................ 29/407.04; 174/72 A; 174/112
[58] Field of Search .......................... 174/135, 112–70 R, 174/71 R, 72 R, 72 A; 439/502, 488; 29/407.09, 407.1, 407.04

[56] References Cited

FOREIGN PATENT DOCUMENTS

| 43-18987 | 9/1958 | Japan | 174/112 |
| 4-169005 | 6/1992 | Japan | 174/112 |
| 260837 | 11/1926 | United Kingdom | 174/112 |
| WO 82/03942 | 11/1982 | WIPO | 174/112 |

OTHER PUBLICATIONS

Southwire Company, Electrical World, p. 66, Apr. 1978.

*Primary Examiner*—Kristine Kincaid
*Assistant Examiner*—Kamand Cuneo
*Attorney, Agent, or Firm*—Jordan B. Bierman; Bierman, Muserlian and Lucas

[57] ABSTRACT

A wire harness including a plurality of wires surrounded by an outer tube wherein the outer surface thereof has an axial line drawn thereon. If the harness becomes twisted during handling and before installation, the line becomes helical and, since it is of contrasting color to that of the surface to which it is applied, it is readily visible to the installer. To correct the undesirable twisting, the wire harness is counter-rotated until the line becomes straight once again. The device can then be installed in the usual manner. If installation of a twisted wire harness is attempted, the additional distances which the branches must travel will make them too short to reach their intended connection points. A device for applying the line to the outer surface is also disclosed.

4 Claims, 7 Drawing Sheets

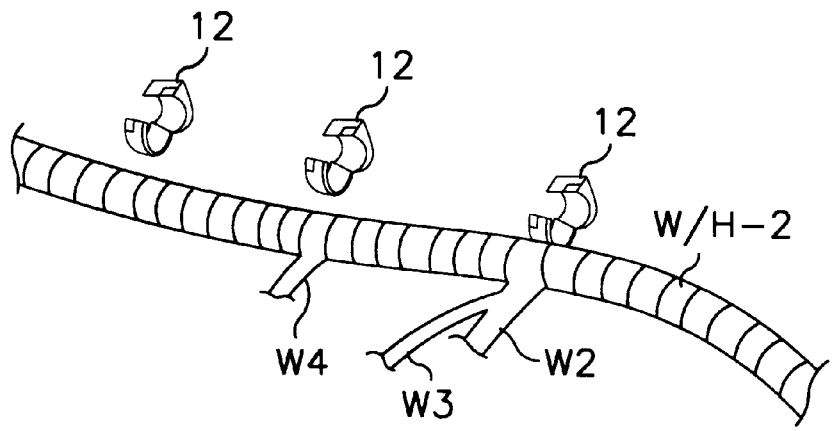
FIG. IIA
PRIOR ART
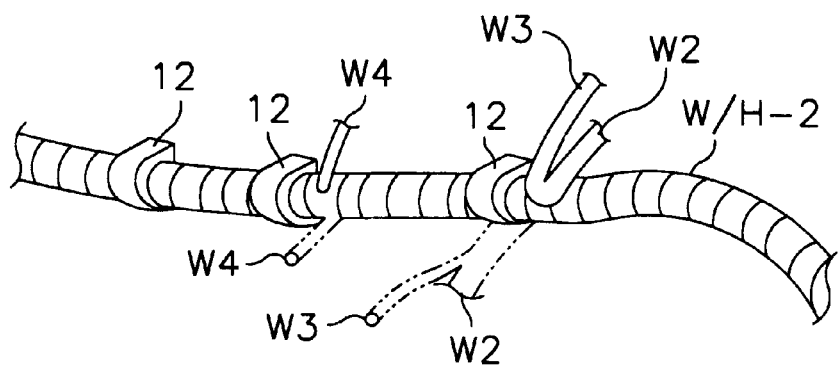
FIG. IIB
PRIOR ART
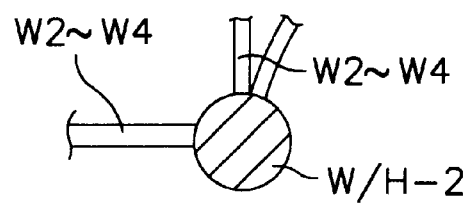
FIG. IIC
PRIOR ART

METHOD AND APPARATUS FOR PREVENTING DISTORTION OF A WIRE HARNESS BY MARKING THE HARNESS WITH A CONTRASTING STRAIGHT LINE

This Application claims the benefit of the priority of Japanese Application 8/14307, filed Jan. 30, 1996.

The present Invention is directed to a method and apparatus for preventing distortion of a wire harness, especially when it is being installed in a motor vehicle such as an automobile. The present Invention is of use whenever distortion (particularly twisting) of a wire harness is a problem. However, for convenience, the Invention will be described with relation to an automobile.

BACKGROUND OF THE INVENTION

With particular reference to FIGS. 6 to 11, automobile 1 is divided by dashboard 3 into engine compartment 2 and passenger compartment 4. The wire harness to be installed consists of inner wire harness W/H-1 and outer wire harness W/H-2. The former is located in engine compartment 2 and the latter in passenger compartment 4 on dashboard 3. Main wire W is secured by clamp 5 to bracket 6 (FIG. 8A) which, in turn, is affixed to engine E. Similarly, wire W is gripped by clamp 10 which is affixed to bracket 9 which is attached to suspension tower 8. Protector 11 is mounted on branch W1.

As can be seen in FIGS. 7 and 8B, inner harness W/H-1 passes through dashboard 3 by way of penetration hole 3a and extends on the other side as outer harness W/H-2. Grommet 7 acts both to secure the wire harness and seal penetration hole 3a. Outer harness W/H-2 is secured to dashboard 3 by switching clamps 12.

However, there is a particular problem which arises in such devices. FIG. 9(A) shows inner wire harness W/H-1 in its normal condition. When this is compared with FIG. 9(B), it can be seen that the axial line (shown in phantom) of FIG. 9(A) is a spiral in FIG. 9(B). This is intended to indicate that inner wire harness W/H-1 has been distorted by twisting about its axis.

When this occurs, as shown in FIG. 10, branch W1 is moved from its straight-line position as shown in FIG. 10(A) to the curved condition as shown in FIG. 10(B). When this happens, there is always the danger that branch W1 will not be long enough to make its intended connection.

A similar problem is found with outer harness W/H-2. In FIG. 11(A), the normal state is shown. Switching clamps 12 fasten outer harness W/H-2 to the dashboard and branches W2, W3, and W4 extend therefrom to the various devices to which they are to be connected. However, outer harness W/H-2 may become twisted, the results of which are shown in FIG. 11(B). Branches W2, W3, W4 in undistorted condition are shown in solid lines, while their positions when outer harness W/H-2 is twisted are shown in chain double dot lines. A section transverse to the axis of outer harness W/H-2 is shown in FIG. 11(C). Here it can be seen how the branches are moved out of position. Because of this, branches W2, W3, and W4 must be curved to bring them to the desired connections. However, this, as in the case of inner harness W/H-1, may leave the branches short of their intended destination.

BRIEF DESCRIPTION OF THE INVENTION

For the foregoing reasons, it is desirable to be able to detect such distortion and correct therefor before attempting to install the wire harness in an automobile. The present Invention is intended to achieve this goal. In accordance therewith, a straight line is applied to the surface of the wire in the axial direction. Moreover, this line is colored to contrast with the wire surface, thereby making it readily visible.

Thus, when the harness is being installed, any distortion resulting from twisting will convert the straight line into a spiral shape. Thus, by noticing this, the installer can reverse the twist until the line is straight; this would indicate and verify that the harness is in its proper and undistorted condition. It can then be installed with reliable knowledge that all of the branches will have length sufficient to reach the connections for which they are intended.

BRIEF DESCRIPTION OF THE DRAWINGS

In the accompanying drawings, constituting a part hereof and in which like reference characters indicate like parts.

FIG. 11(A) is a fragmentary schematic perspective view of the outer wire harness before the application of the switching clamps;

FIG. 11(B) is a view similar to that of FIG. 11(A) showing the switching clamps attached and the branches in both their normal configuration and after distortion; and FIG. 11(C) is a cross-section of the outer harness of FIG. 11(B) transverse to the axis thereof.

DETAILED DESCRIPTION OF THE INVENTION

Figure 1:
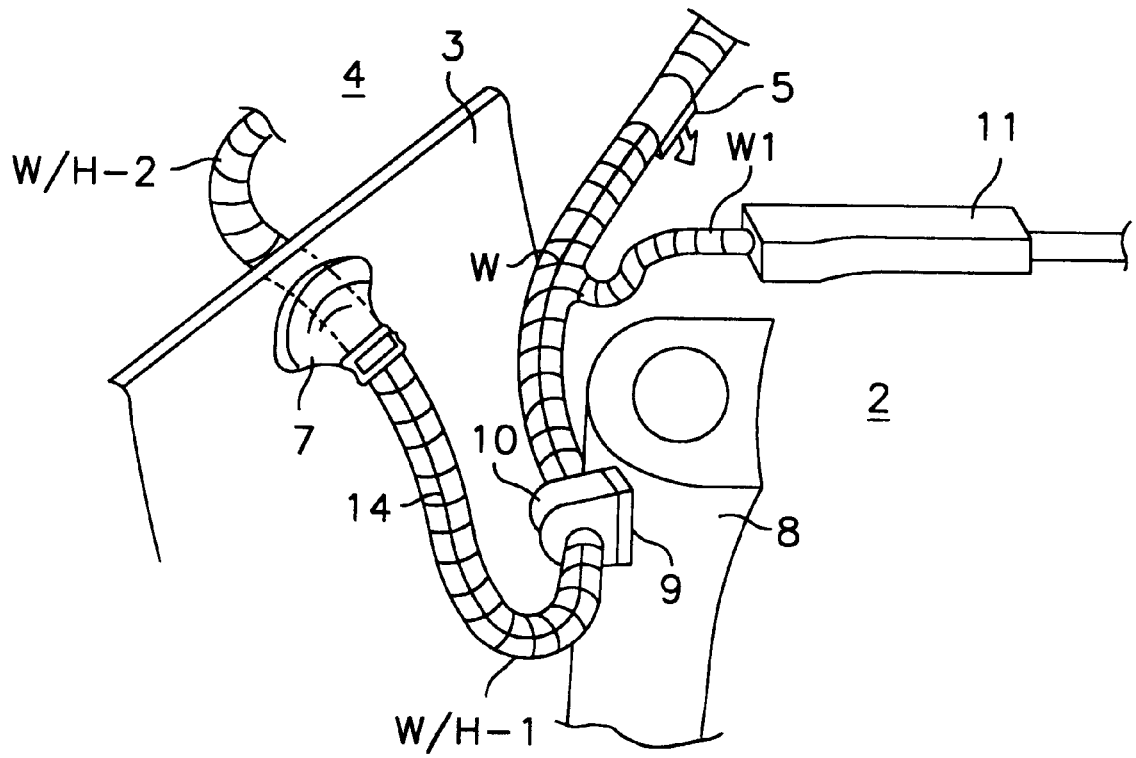
FIG. 1 is a fragmentary schematic perspective view of the present Invention.
Figure 2:
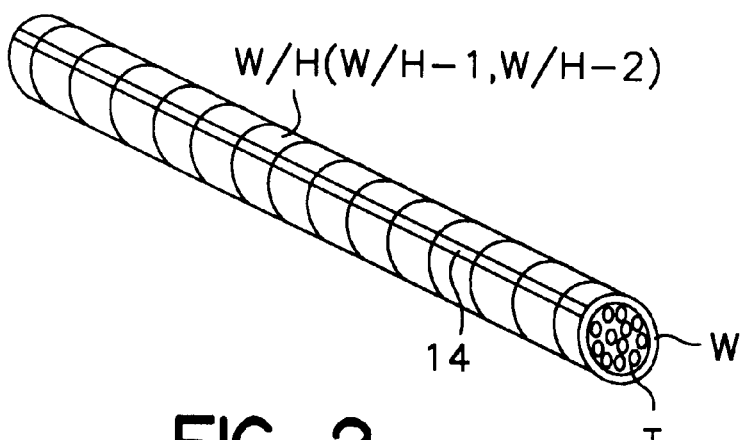
FIG. 2 is a schematic perspective view of a portion of the wire harness of the present Invention.

As shown in FIGS. 1 to 5, the wiring harness consists of inner harness W/H-1 and outer harness W/H-2. The former is located in the engine compartment (on one side of dashboard 3) and the latter is on the other side of dashboard 3. Inner harness W/H-1 passes through penetration hole 3a in dashboard 3 and is sealed by grommet 7.

Inner harness W/H-1 is secured to suspension tower 8 as well as to the engine itself. Protector 11 is located on branch W1. Indicating line 14 is applied to both inner wiring harness W/H-1 and outer wiring harness W/H-2 as particularly shown in FIGS. 1 to 4.

Figure 5A:
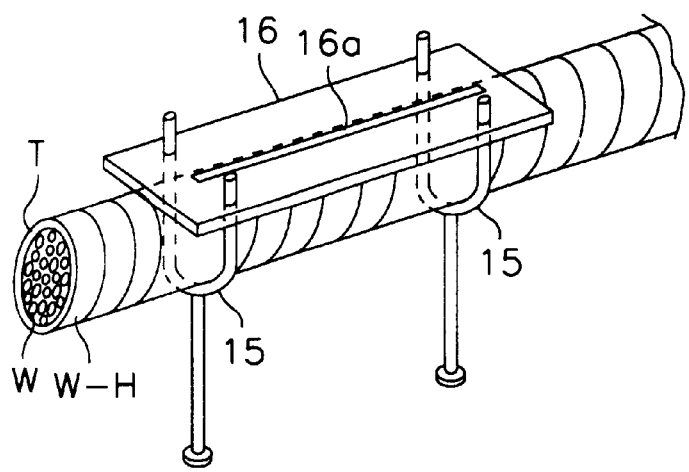
FIG. 5(A) is a device for applying the axial line to the surface of the wire.
Figure 5B:
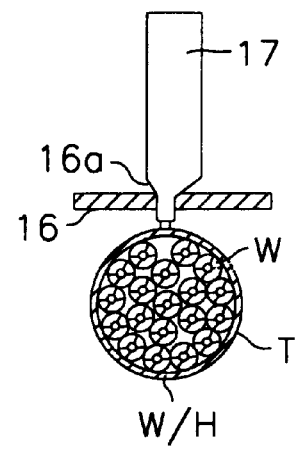
FIG. 5(B) is a cross-section of the harness of FIG. 5(A) transverse to the axis and including the marker pen.
Figure 6:
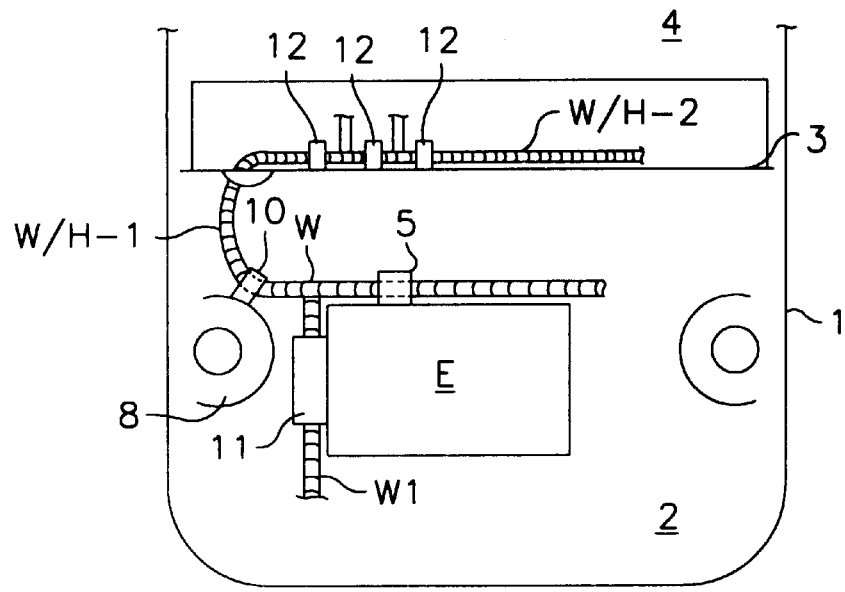
FIG. 6 is a schematic view showing the inner and outer harnesses of the prior art installed in an automobile.
Figure 7:
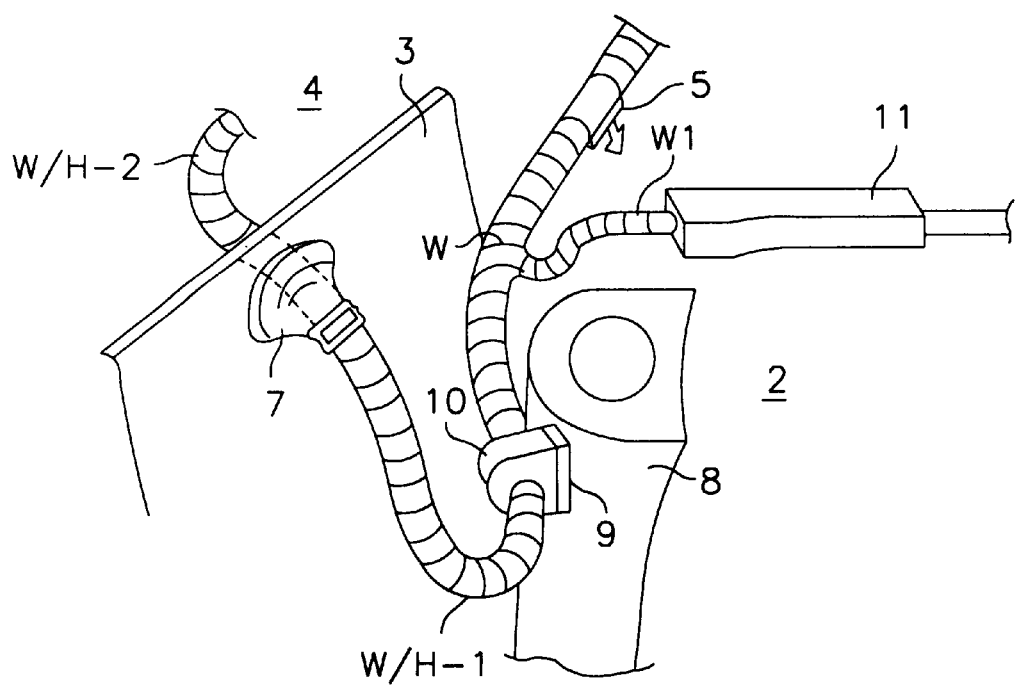
FIG. 7 is an enlarged fragmentary perspective view showing the prior art attachment of the inner harness and a portion of the outer harness.
Figure 8A:
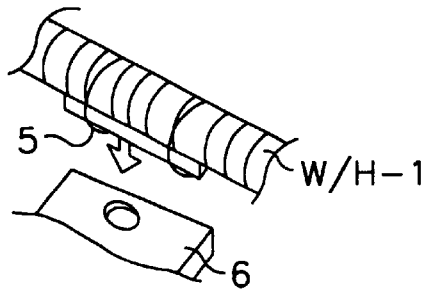
FIG. 8(A) is a view of the prior art device similar to that of FIG. 3(A)
Figure 8B:
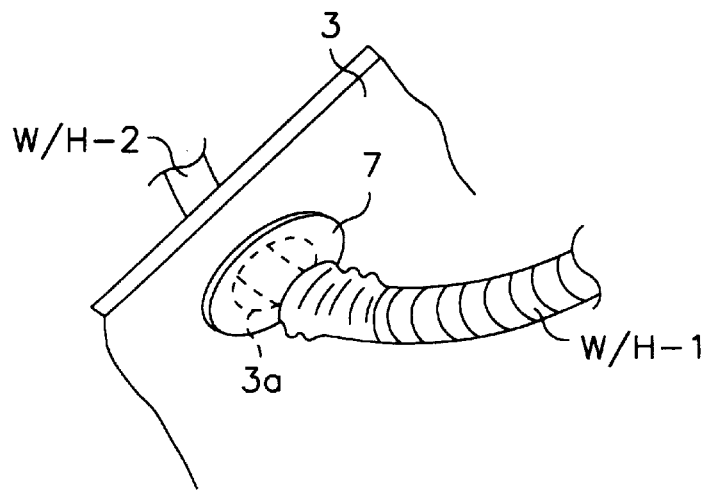
FIG. 8(B) is a view of a prior art device similar to that of FIG. 3(B)
Figure 8C:
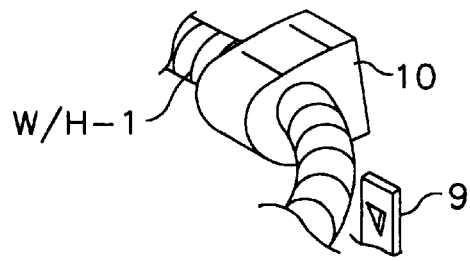
FIG. 8(C) is an enlarged fragmentary perspective view according to the prior art showing the clamp and bracket attaching the inner harness to the suspension tower.

To apply line 14 to the wiring harness, the device of FIG. 5 is useful. The harness comprises wires W surrounded by tube T. Jigs 15 support the wire and pass through holes in Plate 16. Plate 16 has slot 16a and acts as a template for drawing line 14. As can be seen in FIG. 5(B), marker pen 17 passes through slot 16a and contacts the outer surface of tube T. It is then moved the length of slot 16a to apply the desired indicating line 14. Of course, the present Invention is not limited to application of the line in this particular manner. The line could be formed by colored adhesive tape, brush, printing roller, etc. This can be accomplished quickly, easily, and reliably.

Moreover, it is unnecessary to have the line extend throughout the entire length of either the inner harness or the outer harness. It is only those portions of the harnesses which are likely to be subjected to torsion which need to have the line applied thereto. As can be seen, for example, in FIG. 1, the line is not applied throughout the wiring harnesses.

Figure 3A:
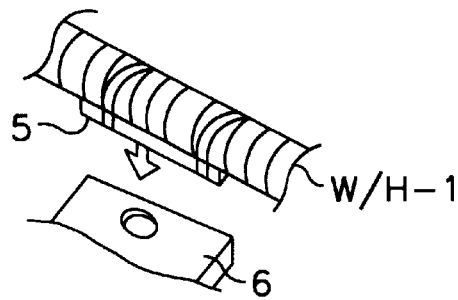
FIG. 3(A) is a fragmentary perspective view showing a clamp and bracket for fixing the wire harness.
Figure 3B:
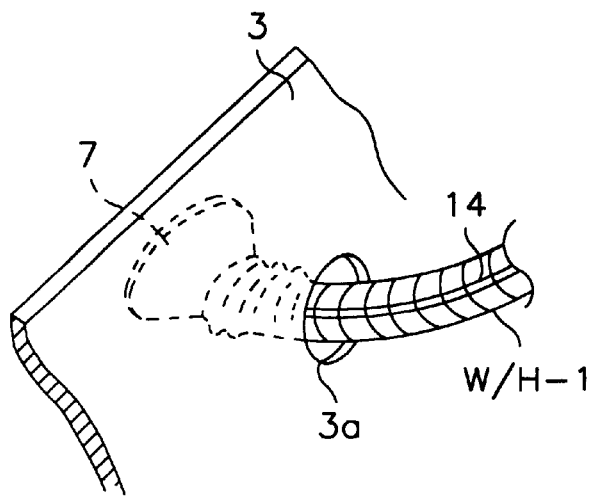
FIG. 3(B) is a view, similar to that of FIG. 3(A), showing the point at which the inner harness passes through the dashboard and extends into the passenger compartment.
Figure 3C:
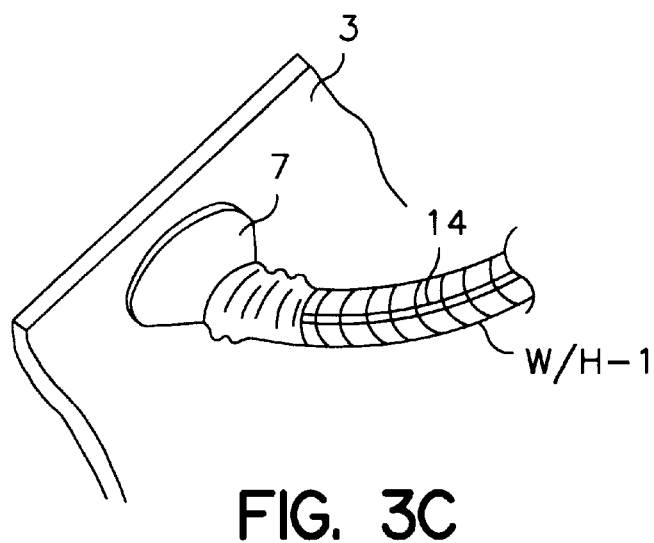
FIG. 3(C) is similar to FIG. 3(B) showing the inner harness in place on the dashboard.
Figure 4:
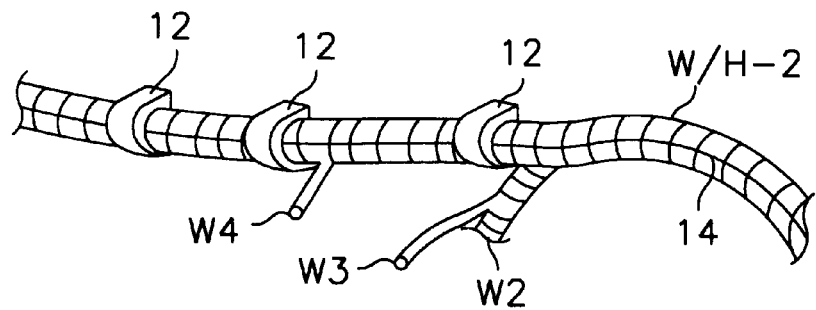
FIG. 4 is a view of the outer wire harness showing the switching clamps and the branches.

According to the present Invention, line 14 is formed on the outer surface of tube T between clamp 5 and grommet 7. When the harness is about to be installed, line 14 is observed and, if it is straight, it is clear that inner harness W/H-1 is undistorted. Inner harness W/H-1 is inserted into clamp 5 of engine E and affixed to bracket 6, as shown in FIG. 3(A). One end is then passed through penetration hole 3a of dashboard 3 into compartment 4 with grommet 7, as can be seen in FIG. 3(B). Inner harness W/H-1 is then pulled toward engine compartment 2 so that grommet 7 is fixed in penetration hole 3a as shown in FIG. 3(C).

Figure 9A:
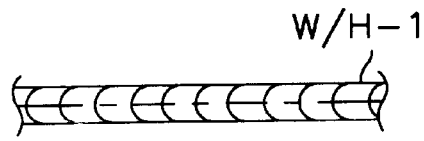
FIGS. 9(A) and (B) is a comparison of the inner wire harness in its proper condition with the same harness having been twisted.
Figure 9B:

On the other hand, if inner harness W/H-1 is twisted, line 14 will exhibit the spiral shape as shown in FIG. 9(B). Since line 14 is of a contrasting color to that of the outer surface of tube T, the distortion is readily noted. At this point, inner harness W/H-1 is counter twisted until line 14 is again straight. This having been accomplished, inner harness W/H-1 is inserted in the same manner as described above.

Figure 10A:
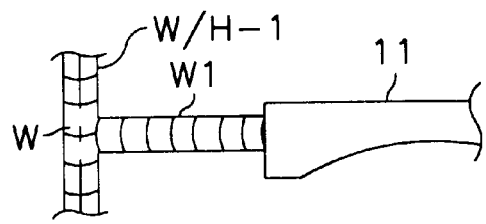
FIGS. 10(A) and (B) show the effect of twisting of the harness on a branch.
Figure 10B:
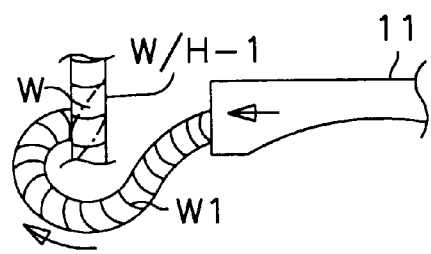

As a result, the branches of inner harness W/H-1 extend in substantially straight lines to their intended connections, as best shown in FIG. 10(A). But for the method of the present Invention, the branches would take the path shown in FIG. 10(B), which would cause them to be too short to reach their intended destinations.

As to outer wire harness W/H-2, it is handled in substantially the same way. Line 14 is observed and, if straight, is inserted into switching clamps 12 and affixed to the passenger compartment side of dashboard 3. Alternatively, as in the case of the inner harness, if line 14 is helical, outer harness W/H-2 is counter rotated until line 14 becomes straight. Thereafter, it is inserted into the clamps in the manner just described.

Thus, the present Invention permits the rapid and easy installation of the wire harnesses with little risk of the undesirable effects of twisting. The axial line can be easily observed, and counter rotation can be applied if necessary. In this way, it is insured that all of the branches are in their proper locations for direct and/or straight-line connection to their intended destinations.

While only certain embodiments of the present Invention have been expressly disclosed, it is, nonetheless, to be broadly construed and not to be limited except by the character of the claims appended hereto.

What we claim is:

1. A method of installing a wire harness in a panel having a hole therein, said wire harness comprising a plurality of wires surrounded by a tube having an outer surface, mounting a grommet on said tube at first point, mounting a clamp on said tube at a second point remote from said first point, at least one branch on said tube between said first point and said second point, said harness having a normal position, wherein said wire harness is untwisted and its branches are of sufficient length to reach their intended connection points, and a distorted position, wherein said harness has been twisted so that said branches are of insufficient length to reach said connection points, application, for the purpose of determining distortion, of a straight axial line to said outer surface while said wire harness is in said normal position, said straight line being of a contrasting color to said surface, said straight line becoming a helical line when said harness is twisted into said distorted position after said application, said method further comprising, attaching said clamp to a fixed bracket and counter rotating said wire harness until said line becomes straight, inserting said grommet into said hole while said wire harness is in the normal position.

2. The method of claim 1 wherein said application comprises holding said wire harness in said normal position, placing a template having a straight slot therein adjacent said outer surface and extending along the longitudinal axis of said wire harness, placing a writing instrument in said slot and in contact with said surface, and moving said instrument along said slot.

3. The method of claim 1 wherein said application comprises affixing a tape in the form of a straight line to said surface while said wire harness is in said normal position.

4. The method of claim 1 wherein said application comprises contacting said surface with an inked roller while said wire harness is in said normal position, and passing said roller along the longitudinal axis of said surface.

* * * * *